United States Patent [19]
Hamilton et al.

[11] Patent Number: 5,248,343
[45] Date of Patent: Sep. 28, 1993

[54] METHOD FOR FINISHING METAL CONTAINERS

[75] Inventors: C. Richard Hamilton, Arvada; Ralph Z. Marsh; Russ Thompson, both of Golden, all of Colo.

[73] Assignee: Golden Technologies Company, Inc., Golden, Colo.

[21] Appl. No.: 849,424

[22] PCT Filed: Dec. 6, 1991

[86] PCT No.: PCT/US91/09310

§ 371 Date: Jul. 10, 1992

§ 102(e) Date: Jul. 10, 1992

Related U.S. Application Data

[63] Continuation-in-part of Ser. No. 624,140, Dec. 7, 1990.

[51] Int. Cl.$^5$ ............................ B08B 3/00; B08B 3/08
[52] U.S. Cl. ........................................ 134/10; 134/26; 134/40; 427/327; 427/353
[58] Field of Search .................... 134/10, 2, 26, 40; 252/162, 171, 174.25, DIG. 14; 413/1, 2, 8; 427/327, 353

[56] References Cited

U.S. PATENT DOCUMENTS

| Re. 29,649 | 5/1978 | Farnsworth | 252/171 |
|---|---|---|---|
| Re. 32,661 | 5/1988 | Binns | 252/142 |
| 2,711,978 | 6/1955 | Groom | 134/10 |
| 2,923,648 | 2/1960 | K'Burg | 134/12 |
| 3,023,144 | 2/1962 | Greathouse et al. | 167/58 |
| 3,025,190 | 3/1962 | Groom et al. | 134/10 |
| 3,094,469 | 6/1963 | Strauss et al. | 204/141 |
| 3,450,086 | 6/1969 | Maddock | 114/74 |
| 3,548,543 | 12/1970 | Evans et al. | 51/8 |
| 3,634,338 | 1/1972 | Laugle et al. | 252/525 |
| 3,876,453 | 9/1975 | Takahashi et al. | 427/327 X |
| 3,951,682 | 4/1976 | Schevey et al. | 134/102 |
| 3,964,936 | 6/1976 | Das | 148/6.27 |
| 3,969,135 | 7/1976 | King et al. | 134/41 |
| 4,009,115 | 2/1977 | Binns | 252/142 |
| 4,082,867 | 4/1978 | Henley et al. | 427/327 |
| 4,091,954 | 5/1978 | Wallace | 220/470 |
| 4,099,989 | 7/1978 | Dorsey, Jr. | 427/327 X |
| 4,136,217 | 1/1979 | Henley | 427/327 |
| 4,270,957 | 6/1981 | Donakowski et al. | 134/2 |
| 4,336,152 | 6/1982 | Like et al. | 252/106 |
| 4,362,638 | 12/1982 | Caskey et al. | 252/90 |
| 4,379,168 | 4/1983 | Dotolo | 424/356 |
| 4,414,128 | 11/1983 | Goffinet | 252/111 |
| 4,445,813 | 5/1984 | Misra et al. | 413/1 |
| 4,477,290 | 10/1984 | Carroll et al. | 148/6 |
| 4,498,934 | 2/1985 | Potts | 134/254 |
| 4,506,533 | 3/1985 | Hessel et al. | 72/42 |
| 4,511,488 | 4/1985 | Matta | 252/162 |
| 4,540,505 | 9/1985 | Frazier | 252/106 |
| 4,599,116 | 7/1986 | King et al. | 134/2 |
| 4,620,937 | 11/1986 | Dellutri | 252/143 |
| 4,640,719 | 2/1987 | Hayes et al. | 134/40 |
| 4,654,089 | 3/1987 | Singelyn et al. | 134/26 |
| 4,704,225 | 11/1987 | Stoufer | 252/153 |
| 4,749,516 | 6/1988 | Brusky | 252/546 |
| 4,767,563 | 8/1988 | de Buzzaccarini | 252/174 |
| 4,790,951 | 12/1988 | Frieser et al. | 252/162 |
| 4,797,231 | 1/1989 | Schumann et al. | 252/547 |
| 4,798,218 | 1/1989 | Sauvan | 134/74 |
| 4,865,742 | 9/1989 | Falletti | 210/637 |

FOREIGN PATENT DOCUMENTS 1603047 11/1981 United Kingdom .

Primary Examiner—Theodore Morris
Assistant Examiner—Saeed T. Chaudhry
Attorney, Agent, or Firm—Sheridan Ross & McIntosh

[57] ABSTRACT

A method for finishing metal surfaces, especially that of metal containers, using a cleaning agent having a substantially neutral pH is provided. In one embodiment of the invention lubricants and coolants used during container forming processes are cleaned from the surface of metal containers by using a terpene cleaning agent comprising d-limonene, alpha-terpineol, beta-terpineol, alpha-pinene, beta-pinene, alcohols of such agents or mixtures thereof. Surfactants may also be used to aid in the cleaning process. The organic component of the cleaning agent, as well as lubricants, coolants and aqueous components, are separated for recycling and re-use. Cleaning metal surfaces according to the method of the present invention has many attendant advantages including decreased roughness and increased reflectivity of metal surfaces, increased mobility on a container production line, and reduced amounts of paint, overcoat and internal coat required to decorate metal surfaces.

17 Claims, 4 Drawing Sheets

METHOD FOR FINISHING METAL CONTAINERS

REFERENCE TO RELATED APPLICATION

This application is a continuation-in-part application of U.S. application Ser. No. 07/624,140, filed on Dec. 7, 1990, entitled "Method for Manufacturing Metal Containers."

FIELD OF THE INVENTION

This invention relates to the cleaning of metal surfaces and to the preparation of metal surfaces for subsequent application of protective and decorative coatings or other finishes. This invention specifically relates to the cleaning of lubricants and coolants from metal containers used in the manufacturing of such containers and to the recycling of cleaning agents, lubricants and coolants and water used in such manufacturing process.

BACKGROUND OF THE INVENTION

In various industries it is necessary to clean oils from the surfaces of metal prior to decorating such surfaces with paint, ink or various other protective or decorative coatings. For example, in the manufacture of metal containers, such as beverage containers, metal blanks are stamped and then formed by drawing and ironing into a desired container configuration, and finally decorated. During the forming process, lubricants and coolants are deposited on the metal surfaces. Residual quantities of lubricants and coolants must be removed from the surface of the metal prior to printing, overcoating, internal coating or other decorating or detailing of the cleaned metal surface.

Currently, the industry uses cleaning agents consisting of either relatively strong acid or caustic solutions. Primarily strong acid solutions consisting of hydrofluoric, sulfuric, phosphoric, nitric, and similar acids are used. For example, U.S. Pat. Re. No. 32,661 to Binns discloses a method of cleaning aluminum using an acidic aqueous cleaning solution having a pH less than 2. Similarly, U.S. Pat. No. 3,969,135 to King discloses a composition and process for cleaning aluminum using a low temperature aqueous acidic solution with a pH of less than 2.

While the use of acidic and caustic solutions to clean metal is effective to remove oils, the use of such solutions presents multiple problems in the treatment of used cleaning and rinse solutions, and has negative effects on the appearance and integrity of such metal when it is used, for example, in the manufacture of containers. The acidic and caustic cleaning agents currently in use in container manufacturing operations etch and pit the metal surfaces being cleaned, thereby diminishing the strength of the metal, often making such containers unusable. During drawing and ironing procedures for the manufacture of aluminum beverage containers, manganese-iron particles in the aluminum may create pin holes and gouges in the containers. Acidic and caustic cleaning agents deepen such holes and gouges and often result in containers deemed unusable "pinhole leakers."

The etching and pitting of metal surfaces caused by use of an acid and caustic wash cleaning agent increases the roughness of the metal surface and consequently reduces the reflectivity of the metal surface. Reduced reflectivity in turn results in reduced color enhancement of inks applied to the metal surface. The reduced reflectivity and reduced color enhancement are aesthetic detractors and, therefore, metal surfaces cleaned with acidic or caustic washes are not as pleasing in appearance to the ultimate consumer. Such aesthetic detraction applies not only to aluminum beverage containers, but also to a myriad of other products in the marketplace, including, for example, finished metal surfaces for cars, trucks and airplanes, face plates for calculators and computers, etc.

Metal containers cleaned with an acidic or caustic wash require more ink, overcoat and inner coat because the etches and pits resulting from such washes result in a greater surface area to be covered. Reduction in the etching and pitting on a container's surface would result in the use of less ink, overcoat or inner coat and, therefore, in a significant cost savings.

The use of acidic or caustic washes also creates ionization points on a metal's surface. These ionization points form electrical attractions to polar molecules, such as water. Typically, after cleaning of a metal surface with an acidic or caustic wash, the metal surface is rinsed with water and then dried. Because rinse water tends to adhere to the ionization points formed on the metal's surface, a longer drying time is required.

Acidic and caustic cleaning agents currently used to clean metal surfaces also pose serious health risks to personnel performing cleaning operations.

Finally, substantial environmental problems are created due to the use of acidic and caustic agents in the metal cleaning industry. Conventional acid or caustic cleaning agents require neutralization prior to their discharge. Several disadvantages are encountered in such neutralization, including the cost of the materials and the handling problems associated with such toxic chemicals. The corrosive nature of acid and caustic cleaning solutions also damages processing equipment used in the cleaning of metal containers. Moreover, once mixed with rinse water, acidic and caustic cleaning agents are not readily recoverable. Further, the acidic and caustic cleaning agents currently in use etch the metal surfaces and produce waste solutions with dissolved metal, creating additional waste disposal problems.

The use of conventional acidic and caustic cleaning agents also reduces the mobility of containers conveyed in a contiguous manner on a production line due to the friction between the containers created by etches and pits on the container's surfaces. The reduced mobility of the containers on a production line results in jamming of the processing machinery and causes downtime on the production line. In a typical container manufacturing facility, acid washed containers typically jam the production line machinery approximately one to three times an hour. Such jamming necessitates the stopping of the production line and the manual extraction of containers which fall out of the production track.

In view of the above, a need exists for a new method for cleaning and finishing metal surfaces, especially in the manufacturing of metal containers. The present invention addresses this need by providing a method for manufacturing metal containers using a terpene based cleaning agent which has a substantially neutral pH and is capable of removing lubricants and coolants from metal surfaces without the problems associated with the use of acidic and caustic cleaning agents. The present invention also provides an economical method of recycling the cleaning agent, lubricants, coolants and water used in container manufacturing processes in a substantially closed loop system.

SUMMARY OF THE INVENTION

The present invention includes a method for cleaning metal surfaces and is particularly suited for cleaning metal containers during the manufacture of such containers. In one embodiment, a terpene based cleaning agent having a substantially neutral pH is used to remove lubricants and coolants applied during the manufacture of metal containers. The pH of the cleaning agent used can range from about 6 to about 9 and preferably includes, as an active agent, a terpene such as d-limonene, alpha-terpineol, beta-terpineol, alpha-pinene, beta-pinene, alcohols of these compounds, or mixtures thereof. The cleaning agent is preferably applied in conjunction with a surfactant to assist in emulsifying lubricants and coolants and the active agent. The present process further includes recovering the cleaning agent and removed lubricants and coolants by successively rinsing metal containers with water and separating the active agent of the cleaning agent, lubricants and coolants, and water for re-use in further cleaning operations. Thus, the invention includes a substantially closed loop recycling system for finishing metal articles.

One aspect of the present invention is directed to a method for cleaning metal containers in which metal containers are contacted with a terpene based cleaning agent and rinsed with water to obtain a container having increased reflectivity and a roughness average (Ra) below about 6 Ra as measured on the outside diameter of said metal container. The roughness average of cans cleaned, for example, with an acid cleaning agent, is over about 6.0 Ra.

Another aspect of the present invention involves the coating of a metal's surface with a protective or decorative coating comprising cleaning the metal surface with a terpene based cleaning agent followed by rinsing with water, drying, and coating the metal surface thereafter. It has been unexpectedly found that approximately 35 percent less exterior coatings of paint, ink and other protective and decorative coatings are required when surfaces are cleaned in accordance with the present invention, as compared with metal surfaces cleaned using conventional acidic or caustic cleaning agents.

The present invention also provides a method to reduce etching of a metal surface comprising contacting the metal surface with from about 3 percent to about 37 percent by volume of a terpene based cleaning agent. Due to this reduced surface roughness, a method for reducing jamming of conveyer equipment used in the production of metal containers on a production line is provided. The present invention also reduces the formation of ionization points on a metal's surface, thereby reducing electrical attraction to polar molecules such as water, permitting shortened drying times with consequent savings of time and money.

DETAILED DESCRIPTION OF THE INVENTION

The method of the present invention is suitable for the cleaning of any metal surface wherein the metal surface is cleaned and thereafter painted, overcoated, internal coated, or otherwise decorated. Such metal surfaces include, but are not limited to, cars, airplanes, railroad cars, road signs, metal components used in high technology industries, computer and calculator faceplates, etc. One notable and specific use of the method of the present invention is for cleaning the surfaces of metal containers. In particular, the present invention includes a process for cleaning lubricants, coolants and metal fines from metal containers and/or from metal used in making metal containers by contacting a substantially neutral pH cleaning agent to the metal surface during the manufacturing process.

The present invention generally relates to a method for cleaning metal surfaces, and in particular, surfaces of aluminum, steel, brass, copper or alloys thereof, by contacting the metal surfaces with a terpene-based cleaning agent. The term container, as used herein, refers but is not limited to, beverage cans, food containers, and other containers such as aerosol cans and oil filters. The term container also refers to "two piece" cans, i.e. cans in which the sides and bottom are formed from one piece of metal and the top is a second piece, and to "three piece" cans which are formed from three separate top, bottom and side pieces. Oils, and specifically lubricants and coolants, deposited on the surface of the metal during manufacturing processes are effectively removed by contacting the metal surface with a terpene-based cleaning agent in an amount and concentration sufficient to remove lubricants and coolants from the surface of the metal. The cleaning agent may be contacted with the surface of the metal by spraying the cleaning agent onto the metal surface, by immersing the surface of the metal in the cleaning agent, or by any other suitable means. The resultant mixture of cleaning agent, lubricants and coolants, as well as any water present in the cleaning agent spray, are collected in a reservoir. Subsequently, the metal surface is rinsed with one or more stages of water and the rinse water is collected. The different components from the collected solutions are then separated from each other as discussed below, and reused in the metal cleaning process. In particular, the active agent can be separated from the lubricants and coolants and can be reused in the further cleaning of metal surfaces.

The present invention, as generally described above and more specifically described below, has a number of attendant advantages over conventional cleaning and finishing processes. Many of the problems associated with conventional methods of cleaning metal surfaces with acidic or caustic cleaning agents are eliminated by use of the present invention. Use of a substantially neutral pH cleaning agent allows for the removal of oils, and specifically lubricants and coolants, from metal surfaces without the attendant etching associated with conventional acidic or caustic cleaning agents. In the absence of etching, a metal's surface is smoother than metal surfaces treated with acidic or caustic solutions, thus enhancing the light reflective qualities of metal surfaces and reducing the required amounts of basecoat, ink, overcoat, internal coat or other decorative coatings.

A further advantage of the present invention is that use of the hydrophobic, substantially neutral pH cleaning agent allows for easy recycling of rinse water, lubricants, coolants and active agents because such lubricants, coolants, and active agents are not water miscible and therefore, readily separate from rinse water.

Use of conventional acid or caustic washes etches and pits metal surfaces. In the instance of beverage containers, the etching and pitting weaken the metal and cause "pinhole leakers" rendering such containers useless. By cleaning metal containers according to the method of the present invention, fewer, if any, "pinhole leakers" are generated. Therefore, the number of rejected containers is significantly reduced which results in a cost savings. Moreover, metal articles (i.e. beverage containers) finished according to the method of the present invention have improved mobility on a production line where such articles contact each other. Also, because of the reduction in ionization points, less rinse water is retained on the surfaces of the metal articles cleaned according to the present method, thus reducing drying demands for such articles prior to final finishing operations.

A further advantage of the present invention is the elimination of dangerous acidic or caustic solutions that pose serious risks to employees performing metal container cleaning methods. Moreover, the present invention utilizes cleaning agents that are less expensive than traditional acidic cleaning agents.

Metal coil stock for making metal articles, such as containers, is frequently contacted with a number of compositions to lubricate the surface of the metal and to reduce the temperature of the metal. Such compositions will be generally referred to herein as "oils." Typically, lubricants and coolants are organic compounds and therefore cannot be readily removed with water. Lubricants can include both petroleum-based lubricants and synthetic lubricants, which are typically made of esters, diesters and/or fatty acids. Lubricants commonly include about 25 percent organic components and about 75 percent water. Lubricants used in conventional processes include cutting oils, mill oils, anti-rust oils and silicon based oils. Coolants also often include an organic or petroleum-based and/or a synthetic organic component, typically present in an amount of about 5 percent. As used herein, the term lubricants and coolants refers to any composition having an oil-based component that is applied to metal surfaces and specifically metal used for making metal containers.

The method of the present invention uses a cleaning agent having a substantially neutral pH that effectively cleans lubricants, coolants and other compounds deposited on metal surfaces during the manufacturing process. Substantially neutral pH refers to solutions which, given particular concentrations, amounts and cleaning times, do not cause readily detectable etching of a container's surface. More particularly, substantially neutral pH refers to solutions having a pH of between about 6 and about 9, more preferably between about 6 and about 8, and most preferably between about 6.5 and about 7.5.

In one embodiment of the present invention, the active agent of the cleaning agent is hydrophobic. As such, the active agent of the cleaning agent can be readily separated from water and recycled for further use.

In a further embodiment, the cleaning agent comprises an effective amount of a terpene for a particular cleaning application. Terpenes have the general chemical formula of $C_{10}H_{16}$ and are based on the isoprene unit $C_5H_8$. Preferred terpene compositions of the present invention include d-limonene, alpha-terpineol, beta-terpineol, alpha-pinene, beta-pinene, alcohols of such compositions, or mixtures thereof.

The concentration of an active agent, such as a terpene, used in a particular case depends upon the amount and type of lubricants and coolants being removed, the method of application of the cleaning agent and various other factors. In a preferred embodiment of the cleaning agent, the active agent is in an aqueous solution at concentrations from about 2 percent to about 40 percent, more preferably from about 5 percent to about 30 percent and most preferably from about 10 percent to about 25 percent.

In one embodiment of the invention, surfactants are used in conjunction with the cleaning agent to facilitate rapid wetting of the surface of the metal containers and for emulsification of organic components. Surfactants may be added to the cleaning agent to enhance the solubility of the active agent in the aqueous medium, or they can be separately contacted to the metal surface. Any suitable surfactant or mixtures of surfactants can be used and can be of the non-ionic, anionic, cationic or amphoteric type, and of natural or synthetic origin. Suitable surfactants for use in the present invention include, but are not limited to, nonylphenol, alkanolamide, (nonylphenoxy) polyethylene oxide, sodium salts of petroleum sulfonic acid, sorbitan sesquioleate and mixtures thereof. Specific suitable surfactants include Tergitol NP-7 sold by Union Carbide Corporation and WRS-1-66 sold by Cyclo-Corporation of Miami, Fla.

The concentration of any surfactant used depends upon factors such as the type and strength of the cleaning agent and the amount of lubricants and coolants being removed. For example, in a preferred embodiment of the invention used for cleaning beverage containers, the surfactant Tergitol NP-7 is present in a concentration of about 3 percent by volume to about 12 percent by volume, more preferably about 4 percent by volume to about 8 percent by volume. WRS-1-66 is present in a concentration of about 0.5 to about 2 by volume.

Any conventional technique may be employed to contact the cleaning agent and/or surfactants with the metal surface to be cleaned. Contacting such components to a metal surface may thus be accomplished by spraying, showering or immersing of the metal.

In one embodiment of the present invention, metal containers are cleaned as part of a continuous process for stamping, forming, ironing, doming, cleaning and decorating metal containers. Such a continuous process can include, for example, stamping a circular piece of aluminum from a roll of sheet aluminum and forming the circular piece into a cup-like configuration. The process further includes elongating the container sides by use of one or more ironing dies to form the container to a desired height and final configuration. The bottom of the container can be domed to produce a concave bottom surface of the final container. The containers are then cleaned, for example, by the present process, to remove lubricants and coolants applied to the container during the forming process. The cleaned containers can then be decorated by various known printing techniques. Such containers can then be filled, for example, with beer, beverages or foods and sealed with a top.

The present invention includes the cleaning of metal containers in the above-described container production process in a washer by spraying the cleaning agent and any surfactants of the present invention on the metal containers as they are conveyed past spray heads. For example, containers can be conveyed on a large mesh conveyor, in an open-end down manner, with cleaning agent sprays directed from the top and bottom so that sprays contact all surfaces of the container. Subsequently, the containers are rinsed with water. The containers are then dried, typically, with an oven dryer.

When the lubricants and coolants are removed from the surface of a metal with an acid wash, the acid removes not only the lubricants and coolants, but also the top layer of the metal. Specifically, in the instance of aluminum beverage containers, the aluminum is oxidized by the acid to form aluminum trioxide. The oxidation creates ionization points on the surface of the metal which cause more rinse water to adhere to the surface of the metal. Consequently, and more heat and/or drying time is required in order to adequately dry the metal prior to further cleaning and decorating of the metal. Using the present invention, cost saving benefits are achieved because less water is required to rinse the surface of cleansed metal and less energy is required to dry the surface of the metal.

After a metal surface is cleaned according to the present invention it may be painted and/or overcoated with protective or decorative coatings. In the instance of beverage and food containers, the inside of the container may be lined with a protective coating, or internal coat, to prevent the beverage or food from coming into contact with the metal container. It has been unexpectedly found that metal surfaces cleaned by the process of the present invention require less ink, overcoat and internal coat when the metal surface is cleaned and decorated. Without intending to be bound by theory, it is believed that a reduced amount of ink, overcoat or internal coat is achieved because, in the absence of etching and pitting of the surface of a metal, there is a reduction in the total metal surface area to be coated. As such, a reduced quantity of ink, overcoat or internal coat is required to finish the metal surface. The decorative and protective coatings that may be applied to metal surfaces cleaned in accordance with the present invention include, but are not limited to, ink, paint and plastic.

As compared to conventional processes, it has been unexpectedly found that up to about 35 percent less exterior coating is required to sufficiently paint and overcoat a metal surface using the present invention. In the case of beverage containers, after being printed, the containers may be overcoated with protective cleaners or glosses. As with the quantity of ink required for coverage, it has been unexpectedly found that the surface of a metal cleaned by the method of the present invention requires up to about 35 percent less exterior coating than the surface of a metal cleaned with an acid wash.

Prior to the present invention, it was commonly believed advantageous to use acid wash because by doing so a metal's surface would be etched, thus affording a sufficiently roughened surface for ink, overcoat or internal coat to properly adhere to. However, it has been unexpectedly found that ink, overcoat and internal coat applied to metal surfaces cleaned in accordance with the method of the present invention, adhere in as good a fashion or better, when compared to painted and coated metal surfaces cleaned with an acid wash.

The reduced amount of ink, overcoat and internal coat required translates into significant cost savings. Also, because less ink, overcoat or internal coat is required to decorate the surface of the metal, less time is required to decorate the surface of the metal. The reduction in ink and other coatings also reduces the amount of ink and coatings that must be removed during recycling operations. Therefore, substantial reductions in potentially toxic fumes and environmentally damaging residues may be achieved through use of the method of the present invention.

Moreover, due to a reduction in pitting and etching, there is less friction between metal containers and therefore better mobility of metal containers on a production line. Consequently, less frequent jamming of the production line is experienced and fewer, if any, stoppages of the manufacturing machinery during production of metal containers is required.

The absence of etching and pitting of the metal surface obtained by cleaning metal surfaces according to the method of the present invention also results in improved reflectivity of the surface of the metal due to the reduced roughness of the surface of the metal. The improved reflectivity has an attendant aesthetic advantage of providing a shinier surface of the metal, improved clarity of the ink applied to the surface of the metal and "eye appeal" to the ultimate consumer. The roughness average of a metal surface cleaned according to the present invention is less than about 6.0 Ra, and preferably less than about 5.8 Ra, wherein Ra is defined as the arithmetic mean of the departures of the profile produced by a profilometer from the meanline.

A significant benefit achieved by the present invention relates to the recyclability of the cleaning agents, water and removed oil attendant to the process. In conventional metal cleaning processes acidic and caustic washes are difficult to handle and to dispose of. In contrast, the terpene-based cleaning agent used in the method of the present invention is non-hazardous, poses no dangers to workers on the production line, and is environmentally safe.

In one embodiment of the present invention, a substantially closed loop recycling system is provided for the finishing of metal particles. This system comprises a means for contacting the surfaces of metal articles with a terpene-based cleaning agent, a means for rinsing the cleaning agent from the surfaces with rinse water, a means for recovering the cleaning agent and the rinse water and a means for separating the active agent of the cleaning agent from the rinse water. By using this substantially closed loop recycling system, both the active agent and the rinse water, after being separated, can be reused in the finishing of further metal articles. The above-referenced means for contacting, rinsing, recovering and separating are described in more detail below.

Figure 4:
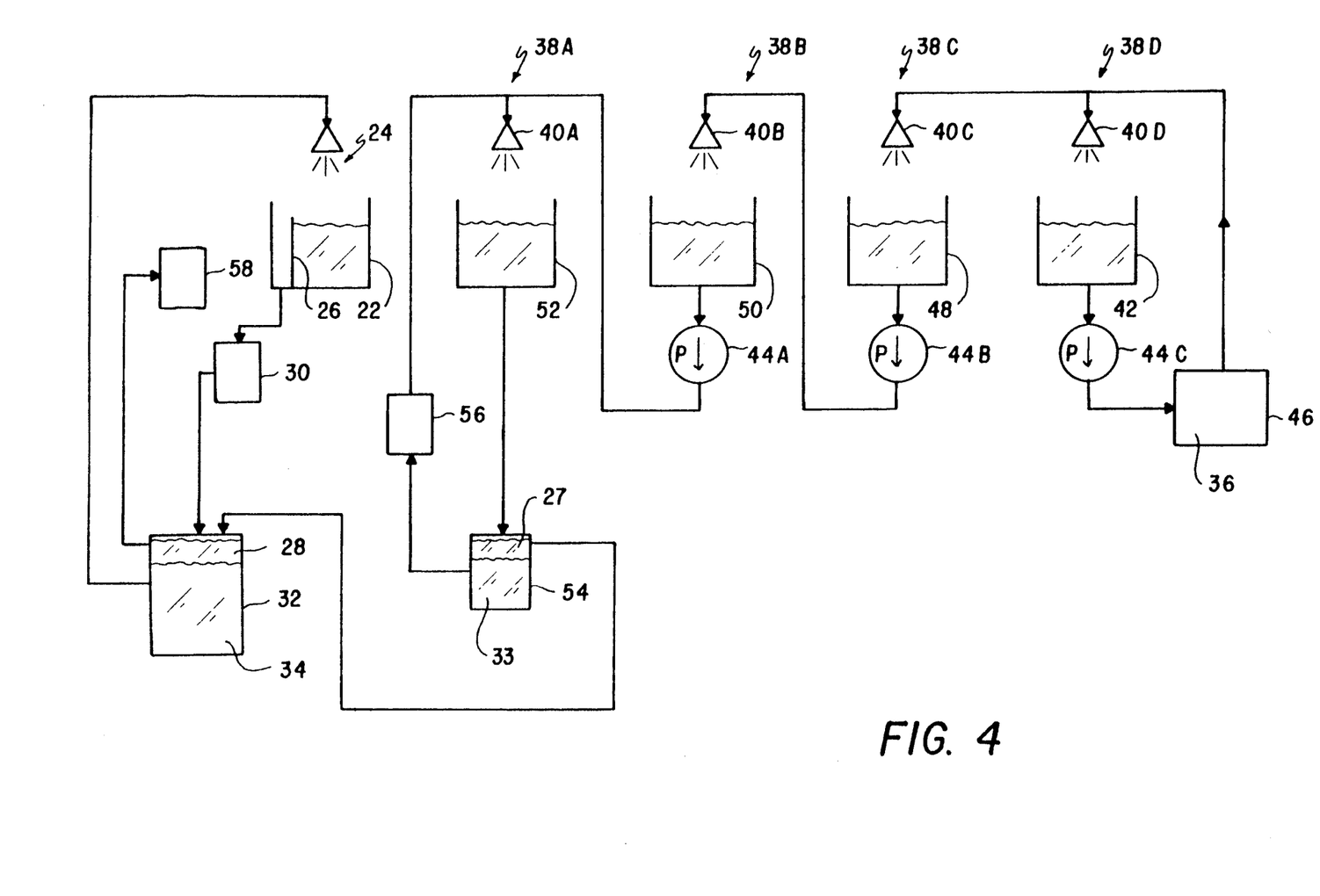
FIG. 4 is a schematic flow diagram showing the spray application of cleaning agent and rinse water and the flow of fluids throughout the washing, rinsing and reclaim stages of the present invention.

One particular embodiment of the invention is directed to the cleansing and finishing of metal containers. Referring to FIG. 4, metal containers (not shown) having lubricants and coolants on their surfaces are conveyed above a washer reservoir 22 and are sprayed with a solution 24 containing the cleaning agent and surfactant. The lubricants and coolants 28 removed from the containers during spraying are collected in the washer reservoir 22, along with the water, cleaning agent and surfactant solution 24. The washer reservoir 22 is provided with a weir 26 that allows lubricants and coolants, cleaning agents, surfactants and water to spill over and be conducted through a filter 30 to remove foreign solid material washed off metal containers prior to being directed to a separator tank 32. In the separator tank 32, lubricants and coolants 28 are allowed to separate from an aqueous cleansing solution 34 comprising cleaning agent, surfactant, and water. After separation from the lubricants and coolants 28 in the separator tank 32, the aqueous cleansing solution 34 is then reused in the above-described spraying process to remove further lubricants and coolants 28 from additional metal containers. The present invention thus provides for an essentially closed loop with respect to the aqueous cleaning solution 34. Addition of water, cleaning agents and surfactant to the washer reservoir 22 is only necessary to replenish that loss caused by evaporation and by adherence of solution to metal containers being conveyed through the washing process.

The phase of the solution primarily comprising lubricants and coolants 28 that separates from the aqueous cleansing solution 34 while in the separator tank 32 can be directed to a clarifier 58 for further separation. The lubricants and coolants can then be reused in the metal container manufacturing operation or disposed of.

After being conveyed through the washer reservoir 22, the metal containers are then further conveyed through successive rinse stages 38 A, B, C and D where they are repeatedly sprayed with water to remove remaining traces of cleaning agent, surfactants, lubricants and coolants, present on the metal containers. A preferred embodiment of the rinsing process includes four rinsing stages 38 A, B, C and D. Metal containers are rinsed successively by each of the four stages. Rinse water is cycled through the first three 38 A, B, C of the four stages for reuse in prior rinse stages. Clean deionized water 36 is used as rinse water in the fourth and final rinse stage 38D, to remove all remaining traces of the above-identified components as well as minerals found in plant process water.

For ease of explanation, the following description of the rinsing process begins with the final stage 38D of the rinsing process and subsequently discusses the other three prior rinse stages 38 A, B, and C in order to correspond to the direction of the flow of water in the process, which is opposite to the direction in which containers are conveyed. In the fourth rinse stage 38D, metal containers are sprayed with deionized water 36 directed through spray heads 40D to remove any last traces of lubricants, coolants, cleaning agent and water. The rinse water from the fourth rinse stage 38D is collected in a fourth stage reservoir 42. The rinse water from the fourth stage 38D is reused by directing it from the fourth stage reservoir 42, through a pump 44C and then through a deionizer 46 for further use in the fourth stage rinse 38D. Deionized water 36 is thus regenerated without the necessity of continuously adding new deionized water from outside of the system. Water loss caused by evaporation or by the adherence of water to the metal containers exiting the fourth rinsing stage 38D is compensated for by the addition of relatively small amounts of additional deionized water 36.

In one embodiment, the rinse water used in the third rinse stage 38C is also deionized water 36. In this embodiment, deionized water 36 is directed from the deionizer 46 used in the fourth stage 38D to the third spray head 40C. Alternatively, tap water can be used as rinser water in the third stage (not shown). The rinse water from the third stage 38C is drained into the third stage reservoir 48, and subsequently conveyed by a pump 44B to the spray head 40B for the second stage rinse 38B.

After water is sprayed from the spray head 40B in the second stage rinse 38B, it drains into the second stage reservoir 50. Water is taken from the second stage reservoir 50 and subsequently conveyed to a pump 44A to the spray head 40A for the first rinse stage 38A. After water is sprayed from the spray head 40A in the first stage rinse 38A, it drains in to the first stage reservoir 52.

Water from the first stage rinse 38A is collected in the first stage reservoir 52 and is recycled for use as rinse water for the first rinse stage 38A. Thus, the first rinse stage 38A is supplied with rinse water from both the first 52 and second 50 stage reservoirs. Recycling of the first stage rinse water is accomplished by use of a separator reservoir 54. Rinse water from the first stage reservoir 52 is directed to the separator reservoir 54 to allow cleaning agents, surfactants, lubricants and coolants 28 to separate from the non-organic water phase 33 of the resulting rinse solution. The lubricants and coolants 28 can then be directed to the separator tank 32. The non-organic water phase 33 is conducted through a filter 56 to remove any remaining lubricants and coolants 28 and is then returned for further use in first stage rinsing 38A of additional metal containers. Thus, in one embodiment of the invention, the water used in the washer reservoir 22 and the water used in the rinsing process, is continuously recycled for use in the cleaning and rinsing of metal containers. The only additional water supplied to the system is deionized water 36 furnished from outside the system.

In another embodiment of the invention, water can be drained from the system at approximately the same rate at which deionized water is introduced to the rinse system to maintain relatively constant levels in each reservoir.

The combined flow rate of rinse water in the four rinse stages 38 A,B, and C is sufficient to completely rinse cleaning agent, surfactants, lubricants and coolants, from the metal containers. Preferably, the amount of water used in each stage is kept to a minimum in order to conserve water while at the same time thoroughly rinsing the metal containers.

After the third rinsing stage 38C, all cleaning agent, surfactants, lubricants and coolants are rinsed from the metal containers and only deionized or tap water is on the metal containers. The fourth rinsing stage 38D rinses all water from the metal containers with deionized water 36. An acceptable flow rate and rinsing time in the fourth rinsing stage 38D to completely rinse water from the metal containers can be determined by experience. It should be appreciated that while use of various volumes of rinsing water may be used, the minimum amount of water necessary to obtain complete rinsing should be used to minimize process time and water use.

Between rinsing stages 38 A, B, C, D or after the final rinse 38D, blowers (not shown) can be used to blow residual water from containers. Containers can then be subsequently dried in ovens or other conventional drying or heating devices.

As discussed above in general and in further detail below, a further aspect of the present invention is the recycling of the various components of the rinses. The rinse water in the first rinse reservoir 52 has the greatest concentration of the cleaning agent, surfactants, lubricants and coolants washed from the metal containers. As discussed above, rinse water from the first rinse reservoir 52 is conducted to a separate rinse separator tank 54. In the rinse separator tank 54, the hydrophobic nature of an organic phase 27, comprising the active agent of the cleaning agent, surfactants, and any lubricants or coolants, makes these components of the rinse water separate from the non-organic water phase 33 of the rinse water solution. The organic phase 27 can be directed from the rinse separator tank 54 to the separator tank 32, leaving the non-organic water phase 33 within the rinse separator tank 54. The non-organic water phase 33 can then be conducted from the rinse separator tank 54 through a filter 56 for reuse in the washing of additional metal containers. In a preferred embodiment, the filter 56 comprises a ceramic filter capable of letting water pass through its walls, while directing all other components in the solution through its length. Water passing through the wall of the filter 56 is essentially clean and may be reused in the cleaning and rinsing operation.

Alternative methods for separating the various components can be used, such as subjecting the mixtures to electro-chemical coagulation, adding de-emulsifiers to the mixture, directing the mixture through oil absorbing filters, such as polypropylene filters, ceramic filters, conducting the mixture through osmotic barriers, or mechanically skimming organic components from the surface of the mixture.

In one embodiment of the invention, separation of oil based lubricants and coolants is facilitated by adjusting the composition of the cleaning agent solution. By increasing the organic component of the cleaning agent solution, lubricants and coolants can be removed from metal surfaces without emulsifying such lubricants and coolants, thus facilitating the later separation of the various components for recycling purposes. For example, an active agent composition comprising about 93 percent d-limonene, 6 percent Tergitol NP-7 and 1 percent WRS-1-66, facilitates the separation of oil based lubricants and coolants from the aqueous cleansing solution 34 because such a composition does not emulsify the oil based lubricants and coolants.

In another embodiment of the invention, de-emulsifying agents can be added to the cleaning agent/surfactant composition to aid in the separation of non-organic and organic factions after use and during recovery. Such de-emulsifying agents can be useful because the use of a strong or concentrated surfactant in the process makes separation of non-organic and organic phases more difficult. Suitable de-emulsifying agents include any de-emulsifiers known to those skilled in the art, such de-emulsifying agents being generally capable of neutralizing charges in order to stabilize dispersion, thus allowing organic phases to coalesce and separate from non-organic phases. In particular, the de-emulsifying agent compositions Mazon TM 77, 80 and 150 may be used in the process. Such agents can be used in concentrations necessary to obtain the desired separating effect in view of other process requirements. The non-organic water phase 33 separated from the organic phase 27, is also available for re-use and may be filtered 56 to remove solids and trace amounts of cleaning agent, lubricant and coolant 27. In one embodiment the filter 56 is made of a material, such as polypropylene, able to absorb organic substances. The filtered non-organic water phase is then returned for use in the rinse stages of the present invention, preferably in the stages prior to the final deionized water rinse 38D.

The following examples and test results are provided for purposes of illustration and are not intended to limit the scope of the invention.

EXAMPLE I

Figure 1A:
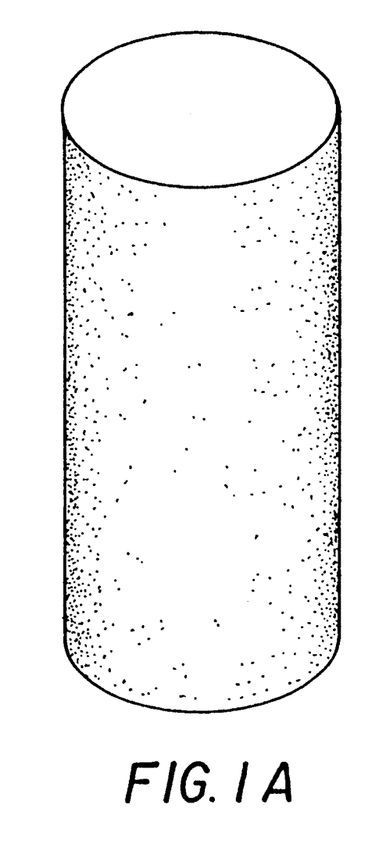
FIG. 1(a) shows an aluminum container washed by a standard acid wash.
Figure 1B:
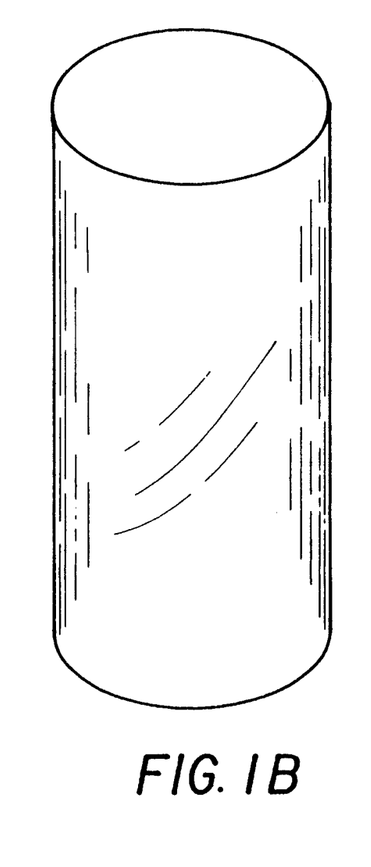
FIG. 1(b) shows an aluminum container washed according to the present invention.

Referring now to FIG. 1, cans washed with a standard acid wash are compared to cans washed according to the present invention. The cans washed in accordance with the present invention have a smoother surface with increased reflectivity as indicated by measurements of roughness. Table 1 below compares the average roughness of cans washed in accordance with the present invention and cans washed using a standard acid wash. Two aluminum cans were analyzed by a scanning electron microscope and a Rank Taylor Hobson Profilometer to determine the difference in surface roughness of the outside and inside diameters of each can. A 10 volume percent terpene composition wash, was used in which the cleaning agent included 93 volume percent d-limonene, 6 volume percent NP-7 and 1 volume percent WRS-1-66. The cans were cleaned using the process described below in Example I. A roughness average is the universally recognized and most used international parameter of the roughness of a surface. A roughness average is the arithmetic mean of the departures of the profile line produced by a profilometer from the mean line.

$$Ra = 1/L_0 \int^L /y(x)/dx$$

TABLE 1

|  | Average Roughness |  |
|---|---|---|
| Terpene Composition Wash | (Inside Diameter) | 5.6 Ra |
| Acid Wash | (Inside Diameter) | 12.5 Ra |
| Terpene Composition Wash | (Outside Diameter) | 2.2 Ra |
| Acid Wash | (Outside Diameter) | 6.0 Ra |

Table 1 indicates that cans washed with the terpene composition produce a clean about two to three times smoother than cans washed in a standard acid wash.

EXAMPLE II

A metal container testing apparatus was provided in which an aluminum container is held in an upside-down orientation. One spray nozzle is directed at the top of the container and a second nozzle is directed at the bottom. A cleaning agent having the composition identified below in Table 2 is sprayed through both nozzles at an aluminum container having lubricants and coolants on it for a period of 55 seconds. The container is then rinsed in a first rinsing tank containing water with manual agitation. The container is then removed and placed in a second rinsing tank containing water with manual agitation. The container is then rinsed in a third rinsing tank containing water with manual agitation and subsequently dried. The total rinsing time was approximately 55 seconds.

TABLE 2

| Ingredient | Percentage by Volume |
|---|---|
| d-limonene | 22.28 |
| Tergitol NP-7 | 2.48 |
| WRS-1-66 | .03 |
| Water | 75.21 |

A comparison of an aluminum container cleaned in this manner with an aluminum container cleaned by traditional acid cleaning process using an acid was comprising 37 percent by volume sulfuric and hydrofluoric acid with a surfactant mix can be seen in FIG. 1. Both containers were formed by an identical process and contained the same lubricants and coolants on their outer surfaces prior to cleaning. As can be seen, the container cleaned by the present process has a shiny, highly reflective surface, while the acid wash container has a much duller, smokey appearance.

EXAMPLE III

A comparative examination of the surface of aluminum containers cleaned by the present process and by a standard acid wash was conducted by taking electron micrographs of the metal container surfaces after washing.

Figure 2:
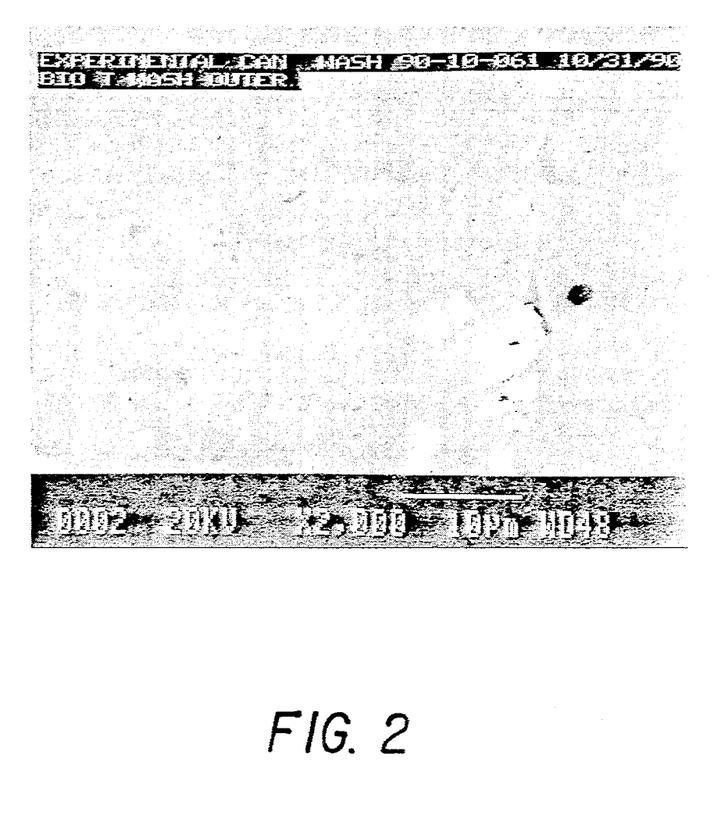
FIG. 2 is an electron micrograph of the surface of an aluminum container washed according to the present invention.
Figure 3:
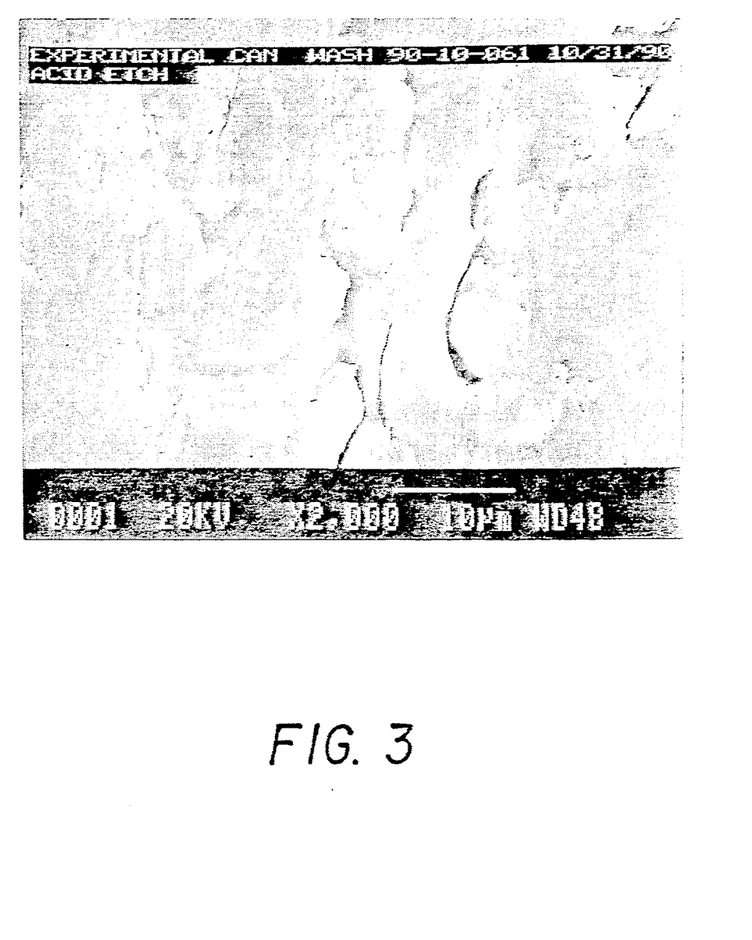
FIG. 3 is an electron micrograph of the surface of an aluminum container washed by a standard acid wash.

The container washed in accordance with the present invention was cleaned according to the process described in Example I. A resulting electron micrograph at magnification of 500X is shown in FIG. 2. A container washed by standard acid wash, as described in Example I is shown in FIG. 3. Comparisons of the containers cleaned by the present process and the acid wash shows that the container cleaned with a d-limonene cleaning agent has a much smoother surface, while the acid wash container has deeper pits and a scratched appearance. The difference in these surfaces accounts for many advantages of the present process, including a shiny appearance and better ink or paint adhesion.

EXAMPLE IV

The effectiveness of a cleaning agent according to the present invention was compared with the effectiveness of a standard acid wash by identifying the number of containers that can be washed prior to the exhaustion of the cleaning solutions. The cleaning agent of the present invention was tested in two different compositions, Composition A and Composition B. Composition A was comprised of 89.1 percent d-limonene, 9.9 percent Tergitol NP-7 and 1.0 percent WRS-1-66; and Composition B was comprised of 93 percent d-limonene, 6.0% Tergitol NP-7 and 1.0 percent WRS-1-66. Tests were performed using different percentage concentrations of each of Compositions A and B.

Containers washed in accordance with the present invention and containers washed with the traditional acid cleaning wash as used in Example I, were cleaned in the manner as set forth in Example I. All containers were cleaned for 55 second and then rinsed in a series of three tap water immersion rinses followed by an immersion rinse in deionized water. The total time elapsed for the three tap water and one deionized water rinses was 110 seconds. The containers were then dried in an oven heated to 450° F.

Table 3 below sets forth the tested solutions in the percentage amounts tested.

TABLE 3

| % Composition | Composition (A/B) | # Cans | Reason for Stopping |
| --- | --- | --- | --- |
| 5 | A | 115 | Dirty cans |
| 5 | A | 110 | Dirty cans |
| 10 | A | 203 | Dirty cans |
| 10 | A | 196 | Dirty cans |
| 5 | B | 29 | Pump failure |
| 5 | B | 200 | Dirty cans |
| 5 | B | 211 | Dirty cans |

TABLE 3-continued

| % Composition | Composition (A/B) | # Cans | Reason for Stopping |
| --- | --- | --- | --- |
| 5 | B | 218 | Dirty cans |
| 5 | B | 205 | Dirty cans |
| 10 | B | 300 | Time constraint |
| 10 | B | 250 | Time constraint |
| 10 | B | 445 | Dirty cans |
| 15 | B | 200 | Time constraint |
| 15 | B | 215 | Time constraint |
| 15 | B | 200 | Time constraint |
| Standard Acid Cleaning Wash | | 100 | Dirty cans |

The notation "dirty cans" indicates that the test was stopped because the cleaning solution composition no longer effectively cleaned cans. The notation "time constraint" indicates that the test was stopped due to testing time limitations even though the cleaning composition was still effectively cleaning cans. The notation "pump failure" indicates that the test was stopped because the pump for spraying cleaning composition failed.

Comparisons of the number of containers able to be cleaned with a given amount of Compositions A and B and those containers cleaned by the same amount of standard acid wash shows that using Compositions A and B allowed for a greater number of containers to be cleaned before the cleaning solutions used no longer effectively cleaned the containers. Using Composition B, two to four times the number of containers could be cleaned than by use of the standard acid wash.

EXAMPLE V

A comparative test run was conducted to compare the results obtained for aluminum beverage containers cleaned with an acid wash and aluminum beverage containers cleaned with a terpene-based cleaning agent according to the method of the present invention. Sixty thousand containers were run through the comparative tests. The results obtained are set forth in Table 4 below.

TABLE 4

| Parameter Tested | Containers Cleaned With Acid Wash | Containers Cleaned With Terpene-Based Cleaning Agent |
| --- | --- | --- |
| Internal coat weight, mg/container | 165 mg | 135 mg |
| ERR (ethanol rater reading) | Okay | Okay |
| Exterior coat weight mg/container (ink plus overcoat) | 190 mg | 122 mg |
| Ink Color | Okay | Okay |
| Container cleanliness (visual measure) 1) with first stage hot water rinse on | Standard | Approximately standard (dark appearance inside) |
| 2) with first stage hot water rinse off | Standard | Approximately standard |
| Stack air outlet, CFM | 1800 | 200 |

As demonstrated from these results, there is a significant reduction in the amount of internal coat and overcoat required to decorate a container cleaned according to the method of the present invention as compared with a container cleaned with an acid wash. Specifically, 18 percent less internal coat is required and 35 percent less exterior coat is required to coat containers cleaned using the present invention, as compared to those cleaned using acidic cleaning agents. The dark appearance of the inside of containers cleaned in accordance with the method of the present invention is thought to be caused by the absence of etched surfaces having the ability to scatter light, making rougher surfaces appear lighter in appearance and smoother surfaces appear darker in appearance.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A method for finishing a metal container, comprising:

contacting said metal container with a terpene finishing agent having a substantially neutral pH; rinsing said finishing agent from said container with water; and applying a coating to the surface of said metal container, wherein the quantity of said coating necessary to coat said metal container is reduced by at least about 18% as compared to substantially identical metal containers finished using an acidic or caustic finishing agent.

2. The method as set forth in claim 1, wherein said coating consists of a protective or decorative coating.

3. The method as set forth in claim 1, wherein the quantity of said coating is reduced by at least 35 percent as compared to metal finished using an acidic or caustic finishing agent.

4. The method as claimed in claim 1, further comprising separating said finishing agent from said oils and reusing said finishing agent in said method.

5. The method as set forth in claim 1, wherein said metal finished in accordance with said method has a roughness average of less than about 5.8 Ra.

6. The method as set forth in claim 1 wherein said metal's surface is more reflective than a metal surface treated with an acidic or caustic finishing agent.

7. A method to reduce the etching of a metal container in the finishing of said container comprising, finishing said container with a composition comprising from about 2 percent to about 40 percent terpene by volume, wherein after said finishing step said metal container has a roughness average of below about 5.8 Ra as measured on the outside diameter of said metal container.

8. The method as set forth in claim 7, wherein said reduction in the etching of the surface of said metal container increases the mobility of said metal container when conveyed in a contiguous manner.

9. The method as set forth in claim 7, wherein said containers require less drying time than containers washed with acidic or caustic finishing agents due to a reduction of ionization points on said containers finished in accordance with said method.

10. A method for increasing the mobility of metal articles conveyed in a contiguous manner, comprising:
    a) cleaning articles with a terpene-based finishing agent before or while said articles are being conveyed, wherein after said cleaning step said finished articles have a roughness average below about 5.8 Ra;
    b) conveying said finished articles in a contiguous manner; and
    c) whereby the friction between said conveyed articles is less than it would be if said articles were cleaned with an acidic or caustic agent.

11. A method to reduce pinholes in metal surfaces during the manufacture of metal surfaces, comprising finishing said surfaces during manufacture with a terpene-based agent, wherein said finished metal has a roughness average of less than about 5.8 Ra and wherein said finished metal has a smoother surface than it would have had if it had been cleaned using an acidic or caustic agent.

12. The method as set forth in claim 11, wherein said metal surface is a container.

13. The method as set forth in claim 11, wherein said terpene-based agent comprises between about 2 percent by volume and 40 percent by volume of a terpene.

14. The method as set forth in claim 11, wherein said terpene is selected from a group consisting of d-limonene, $\alpha$-terpineol, $\beta$-terpineol, $\alpha$-pinene, $\beta$-pinene, and alcohols thereof.

15. The method as set forth in claim 11, wherein said terpene is d-limonene.

16. The method as set forth in claim 11, further comprising rinsing said terpene-based agent from said metal surface with water, separating the terpene from said water and reusing said water and said terpene in said method.

17. A method for covering the interior and exterior surfaces of a metal container, comprising contacting said surfaces with a terpene-based finishing agent and applying below about 190 mg of a decorative and protective coating per container to said exterior surface and below about 165 mg of a protective coating to said interior surface, the quantity of said coatings reduced by at least about 18% as compared to substantially identical containers finished using an acidic or caustic finishing agent.

* * * * *